US007818968B2

(12) United States Patent
Umezu et al.

(10) Patent No.: US 7,818,968 B2
(45) Date of Patent: Oct. 26, 2010

(54) HYDRAULIC CONTROL DEVICE OF CONSTRUCTION MACHINE

(75) Inventors: Yoshiyasu Umezu, Hiroshima (JP); Yutaka Toji, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 463 days.

(21) Appl. No.: 12/018,597

(22) Filed: Jan. 23, 2008

(65) Prior Publication Data

US 2008/0173014 A1 Jul. 24, 2008

(30) Foreign Application Priority Data

Jan. 24, 2007 (JP) ............................ 2007-014293

(51) Int. Cl.
*F16D 31/02* (2006.01)

(52) U.S. Cl. ........................................................ 60/468

(58) Field of Classification Search .................... 60/468
See application file for complete search history.

(56) References Cited

U.S. PATENT DOCUMENTS 5,081,839 A * 1/1992 McWilliams ................. 60/468

FOREIGN PATENT DOCUMENTS

JP 8-93705 4/1996

* cited by examiner

*Primary Examiner*—F. Daniel Lopez
(74) *Attorney, Agent, or Firm*—Oblon, Spivak, McClelland, Maier & Neustadt, L.L.P.

(57) ABSTRACT

A hydraulic control device of construction machine is provided with a control valve lying between a hydraulic pump and a hydraulic actuator for opening and closing a meter-in control flow path, and a flow rate control valve lying between a pump discharge line on the upstream side of the above control valve and a tank. The above flow rate control valve receives a pump pressure and a load sensing pressure corresponding to a pressure on the downstream side of the meter-in control flow path as a pilot pressure, and is activated for opening and closing so as to maintain a constant differential pressure therebetween. The above flow rate control valve is maintained in a closed state by a pilot pressure switching valve when the load sensing pressure is low. The above control valve opens a bypass line when the meter-in control flow path is closed.

5 Claims, 3 Drawing Sheets

HYDRAULIC CONTROL DEVICE OF CONSTRUCTION MACHINE

BACKGROUND OF THE INVENTION

1. Field of the Invention

The present invention relates to a device for controlling a flow rate of working oil supplied from a hydraulic pump mounted in a construction machine such as a hydraulic excavator to a hydraulic actuator.

2. Description of the Related Art

As a device for controlling a flow rate of working oil supplied from a hydraulic pump mounted in a construction machine such as a hydraulic excavator to a hydraulic actuator, a technique described in Japanese Patent Laid-Open No. Hei8-93705 is known for example. A flow rate control valve for transferring a part of discharge oil of the hydraulic pump to a tank controls the flow rate of the working oil in a flow path so as to maintain a constant differential pressure between a discharge pressure thereof and a load pressure of the hydraulic actuator. In the above flow rate control, irrespective of a change in a load of the hydraulic actuator, it is possible to supply the working oil at a flow rate required for the actuator with avoiding waste.

FIG. 3 shows a conventional example of the device for performing such flow rate control.

Here, a control valve 3 is a pilot switching valve lying between a variable capacity type hydraulic pump 1 and a hydraulic actuator (a hydraulic cylinder in the figure) 2. The control valve 3 is activated for opening and closing so that areas of an opening 3*a* for meter-in flow rate control and an opening 3*b* for meter-out flow rate control are changed, and the action thereof follows an operation of a remote control valve 4.

A flow rate control valve 6 is lying between a pump discharge line 5 connecting the hydraulic pump 1 and the control valve 3 and a tank T, and activated for opening and closing so as to change a flow rate of working oil returned from the line 5 to the tank T. In the flow rate control valve 6 serving as a pilot operation type flow rate control valve provided with two pilot ports, to one of the pilot ports is inputted a discharge pressure of the hydraulic pump 1 as a pilot pressure, and to the other pilot port is inputted a pressure on the downstream side of the opening 3*a* of the control valve 3 (a load sensing pressure) as the pilot pressure through a load sensing pipe 11. The flow rate control valve 6 is opened in accordance with a differential pressure between both the pilot pressures. At a flow rate corresponding to the differential pressure, discharge oil of the hydraulic pump 1 is returned to the tank T.

An operation pressure corresponding to an operation amount of an operation lever outputted from the remote control valve 4 serves as the pilot pressure of the control valve 3 and activates the control valve 3. Meanwhile, a pressure value thereof is detected by a pressure sensor 7 and inputted to a controller 8. By inputting a control signal to a regulator 9 installed with the hydraulic pump 1, the controller 8 controls a discharge flow rate of the hydraulic pump 1.

In the device of FIG. 3, generation of shock at the time of starting, that is, at the time of opening the control valve 3 is a problem.

Specifically, when the remote control valve 4 is not operated and the control valve 3 is located at a neutral position, the control valve 3 interrupts between the hydraulic pump 1 and the hydraulic actuator 2. Meanwhile, the controller 8 performs control for suppressing the discharge flow rate of the hydraulic pump 1 to a minimum flow rate. At the time, since the pressure on the downstream side of the opening 3*a* for meter-in flow rate control (the load sensing pressure) is lower than a pump pressure, the flow rate control valve 6 is fully opened. Mainly through the fully opened flow rate control valve 6, the discharge oil of the hydraulic pump 1 is transferred to the tank T.

In such a state, when the lever of the remote control valve 4 is operated and the control valve 3 is opened, the pressure on the downstream side of the opening 3*a* (the load sensing pressure) is instantaneously raised up to a pressure corresponding to a load pressure of the hydraulic actuator 2. The above pressure radically activates the flow rate control valve 6 in the closing direction. Since the radical closing action of the flow rate control valve 6 radically raises the pump pressure, a sense of the shock is easily given to an operator or the like. Particularly, in the case where control for suppressing the discharge flow rate of the hydraulic pump 1 to the minimum flow rate (a standby flow rate) is performed when the control valve 3 is located at the neutral position as mentioned above, the discharge pressure of the hydraulic pump 1, that is, the pump pressure is low. In such a state, when the lever of the remote control valve 4 is operated, the load sensing pressure is rapidly raised and quickly exceeds the pump pressure. Therefore, a differential pressure thereof suddenly activates the flow rate control valve 6 in the closing direction. Moreover, in the above closing action, overshoot is easily caused due to delay of sensing a rise in the load pressure of the actuator by the flow rate control valve, and an inertial force of a valve body itself of the flow rate control valve 6. The above overshoot in the closing action causes a significant change of the pump pressure. Therefore, although the lever of the remote control valve 4 is slowly operated, there is a fear that a significant sense of the shock is given to the operator or the like.

It should be noted that the radical change of the pump pressure can be eased to some extent by designing so as to slow down a response characteristic of the flow rate control valve 6 for example. However, at the time of operation where a radical increase of the actuator flow rate is demanded, such a setting of the response characteristic prevents satisfying the demand quickly.

SUMMARY OF THE INVENTION

It is an object of the present invention to provide a hydraulic control device of construction machine capable of effectively easing shock at the time of starting while favorably maintaining operability.

A hydraulic control device of construction machine according to the present invention comprises a hydraulic pump, a hydraulic actuator to which working oil is supplied from the hydraulic pump, an operation member operated by an operator, a control valve having a meter-in control flow path lying between the hydraulic pump and the hydraulic actuator, the control valve working so as to change a flow rate of the working oil supplied from the hydraulic pump to the hydraulic actuator through the meter-in control flow path following the operation of the operation member, a flow rate control valve lying between a pump discharge line on the upstream side of the control valve and a tank, the flow rate control valve for changing a flow rate of the working oil returned from the pump discharge line to the tank, flow rate control means for activating the flow rate control valve for opening and closing in the direction of maintaining a constant differential pressure between a pressure of the working oil in the pump discharge line and a pressure on the downstream side of the meter-in control flow path, closed valve maintaining means for maintaining the flow rate control valve in a closed state irrespective of the differential pressure when the pressure on the downstream side of the meter-in control flow path is lower than a set pressure which is preliminarily set, a bypass line for communicating with the pump discharge line and the tank on a different route from the flow rate control valve, and bypass switching means for opening the bypass line when the control valve closes the meter-in control flow path, and decreasing a flow path area of the bypass line following an increase in a flow path area of the meter-in control flow path.

In the above device, when the control valve interrupts between the hydraulic pump and the hydraulic actuator (for example when located at a neutral position), the flow rate control valve is maintained in a closed state by the closed valve maintaining means. However, since the bypass line is opened, the discharge oil of the hydraulic pump is transferred through the bypass line without any trouble. Then, after the operation member is operated and the control valve is activated, the flow path area of the meter-in control flow path is increased and the flow path area of the bypass line is decreased. Thereby, the discharge oil of the hydraulic pump is led to the hydraulic actuator side. At the time, the discharge pressure (the pump pressure) of the hydraulic pump is raised. However, since there is no sharp closing action of the flow rate control valve as in the conventional example, the pump pressure is slowly raised.

Then, from a point when the differential pressure between the pump pressure and the pressure on the downstream side of the meter-in control flow path (that is, the pressure corresponding to a load pressure of the actuator) exceeds a fixed pressure, the flow rate control valve is opened. Then, irrespective of a change in the load pressure, the flow rate is controlled so as to maintain the constant differential pressure. The flow rate control valve is also slowly opened at the time. Even if overshoot is caused in the opening action, since the opening action is an action in the transferring direction of the pressure, the overshoot does not easily give a sense of the shock to an operator or the like.

Preferred and specific aspects of a configuration for performing the flow rate control include cases where the flow rate control valve, the flow rate control means and the closed valve maintaining means have the following configurations.

Firstly, the flow rate control valve is a pilot operation flow rate control valve having a pump side pilot pressure input unit and a load side pilot pressure input unit to which a pilot pressure is inputted respectively, and working so as to make a flow rate of the working oil to be a flow rate corresponding to a difference between a pilot pressure inputted to the pump side pilot pressure input unit and a pilot pressure inputted to the load side pilot pressure input unit.

Next, the flow rate control means includes a pump side pilot line for inputting the pressure of the pump discharge line to the pump side pilot pressure input unit and a load side pilot line for inputting the pressure on the downstream side of the meter-in control flow path to the load side pilot pressure input unit.

Then, the closed valve maintaining means includes pilot pressure switching means for interrupting at least one pilot line among both the pilot lines so that both the pilot pressures become a pilot pressure for closing the flow rate control valve when the pressure on the downstream side of the meter-in control flow path is equal to or lower than the set pressure.

According to the above configuration, with a simple configuration of only changing the pilot line for operating the flow rate control valve, it is possible to maintain the flow rate control valve in a closed state.

For example, it is preferable that in the case where the flow rate control valve is maintained in a closed state at least when the pilot pressure inputted to the pump side pilot pressure input unit is equal to the pilot pressure inputted to the load side pilot pressure input unit, the pilot pressure switching means is a pilot pressure switching valve capable of switching between a normal position for opening the load side pilot line and a closed valve maintaining position for interrupting the load side pilot line and inputting a pressure corresponding to a discharge pressure of the pump to the load side pilot pressure input unit, and also capable of switching to the closed valve maintaining position only when the pressure on the downstream side of the meter-in control flow path is equal to or lower than the set pressure.

The pilot pressure switching means may be a pilot pressure switching valve capable of switching between a normal position for opening the pump side pilot line and a closed valve maintaining position for interrupting the pump side pilot line, and also capable of switching to the closed valve maintaining position only when the pressure on the downstream side of the meter-in control flow path is equal to or lower than the set pressure.

Meanwhile, with regard to the bypass line, it is preferable that the control valve also serves as the bypass switching means, and the control valve is provided in the middle of the bypass line for opening the bypass line only at a position of interrupting between the hydraulic pump and the hydraulic actuator.

According to the above configuration, since the control valve also serves as the bypass switching means, a structure is simplified at the rate. It is possible to surely interlock the action of the control valve and open-close switching of the bypass line.

As mentioned above, the present invention has the means for maintaining the flow rate control valve in a closed state when the control valve closes the meter-in control flow path thereof, as well as the bypass switching means for opening the bypass line at the time and transferring the discharge oil of the hydraulic pump to the tank. Therefore, it is possible to exhibit an effect of effectively easing the shock at the time of starting while favorably maintaining the meter-in operability.

DESCRIPTION OF THE PREFERRED EMBODIMENTS

A description will be given to a first embodiment of the present invention with reference to FIG. 1.

Figure 1:
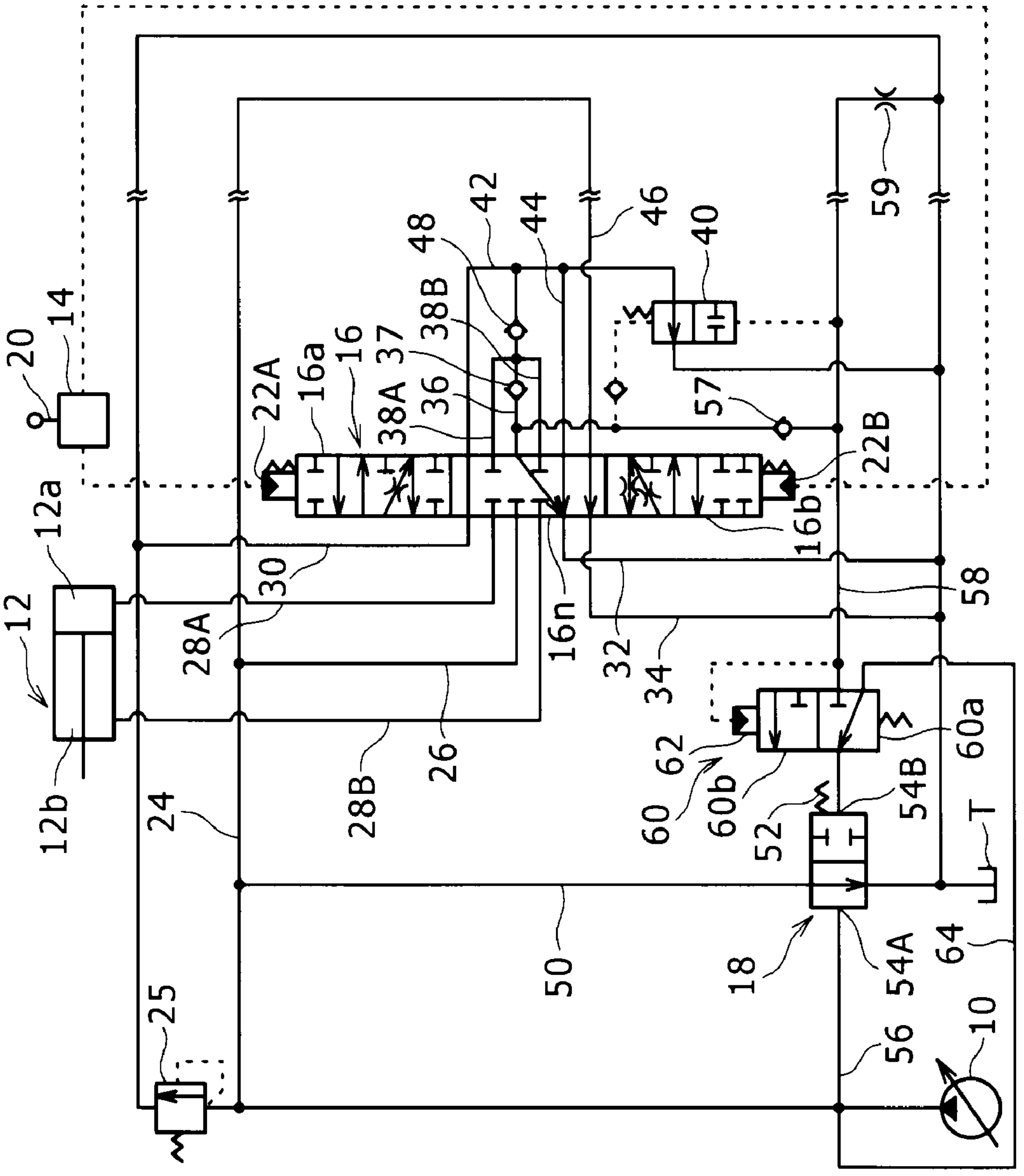
FIG. 1 is a circuit diagram showing a hydraulic control device according to a first embodiment of the present invention.

FIG. 1 is a circuit diagram showing a hydraulic control device according to the first embodiment of the present invention. The hydraulic control device is to control a flow rate of working oil supplied from a hydraulic pump 10 mounted in a construction machine to a hydraulic cylinder 12 serving as a hydraulic actuator, and provided with a remote control valve 14, a control valve 16 and a flow rate control valve 18.

The hydraulic pump 10 is formed of a variable capacity type hydraulic pump in an example of the figure. A capacity thereof is controlled by a regulator (not shown). However, the present invention is not limited to application of the variable capacity type hydraulic pump, but a fixed capacity type hydraulic pump can also be applied. The hydraulic actuator according to the present invention is also not limited the hydraulic cylinder 12, but for example a hydraulic motor to which the working oil is supplied can be applied to the present invention.

The remote control valve 14 has an operation lever 20 serving as an operation member operated by an operator. A pilot pressure corresponding to the operation direction and an operation amount of the operation lever 20 is outputted to the control valve 16.

The control valve 16 is lying between the hydraulic pump 10 and the hydraulic actuator 12. By receiving the pilot pressure outputted by the remote control valve 14, the control valve 16 works so as to change the flow rate of the working oil supplied from the hydraulic pump 10 to the hydraulic cylinder 12.

In the example of the figure, the control valve 16 is formed of a hydraulic pilot switching valve with three positions and twelve ports. Specifically, the control valve 16 has, as an operation position, a neutral position 16*n*, an extended drive position 16*a* and a contracted drive position 16*b*, and also has two pilot ports 22A and 22B. When the pilot pressure is not supplied to any of the pilot ports 22A and 22B, a valve closing position, that is, the neutral position 16*n* is maintained. When the pilot pressure is inputted to the pilot port 22A, the control valve 16 is opened to the extended drive position 16*a* side for a stroke corresponding to the above pilot pressure. When the pilot pressure is inputted to the pilot port 22B, the control valve 16 is opened to the contracted drive position 16*b* side for a stroke corresponding to the above pilot pressure.

Among the twelve ports of the above control valve 16, six ports on one side are respectively connected to the following pipes:

1) a supply pipe 26 branched from a pump discharge pipe (a pump discharge line) 24 connected to the discharge side of the hydraulic pump 10;
2) a head side pipe 28A connected to a head side chamber 12*a* of the hydraulic cylinder 12;
3) a rod side pipe 28B connected to a rod side chamber 12*b* of the hydraulic cylinder 12;
4) a return pipe 30 connected to a tank T;
5) a return pipe 32 connected to the tank T; and
6) a bypass return pipe 34 connected to the tank T.

Six ports on the other side are respectively connected to the following pipes:

7) a cylinder supply pipe 36;
8) a head side supply pipe 38A connected to the cylinder supply pipe 36 through a check valve 37;
9) a rod side supply pipe 38B connected to the cylinder supply pipe 36 through the check valve 37;
10) a pressure compensation pipe 42 connected to the tank T through a pressure compensation valve 40 described later;
11) a pressure compensation pipe 44 connected to the tank T through the pressure compensation valve 40; and
12) a bypass pipe 46 branched from the pump discharge pipe 24.

It should be noted that a relief valve 25 is lying between the pump discharge pipe 24 and the tank T. The pressure compensation valve 40 is not always required in the present invention.

The check valve 37 prevents a reversed flow of the working oil from the head side supply pipe 38A and the rod side supply pipe 38B to the cylinder supply pipe 36. The above supply pipes 36, 38A and 38B are connected to the pressure compensation pipe 42 through a shared check valve 48. The check valve 48 prevents the reversed flow of the working oil from the supply pipes 36, 38A and 38B to the pressure compensation pipe 42.

The neutral position 16*n* is a position where the control valve 16 interrupts between the hydraulic pump 10 and the hydraulic cylinder 12. Specifically, the control valve 16 connects and interrupts oil paths at the neutral position 16*n* as follows.

N1: the supply pipe 26, the head side pipe 28A, the rod side pipe 28B, the head side supply pipe 38A and the rod side supply pipe 38B are all blocked.

N2: the pressure compensation pipe 42 is connected to the return pipe 30, and the cylinder supply pipe 36 and the pressure compensation pipe 44 are connected to the return pipe 32 together.

N3: the bypass pipe 46 is connected to the bypass return pipe 34. That is, a bypass line for communicating with the pump discharge pipe 24 and the tank T roundabout the hydraulic cylinder 12 is opened.

The extended drive position 16*a* is a position where the control valve 16 leads discharge oil of the hydraulic pump 10 to the head side chamber 12*a* of the hydraulic cylinder 12 and extends the hydraulic cylinder 12. Specifically, the control valve 16 connects and interrupts the oil paths at the extended drive position 16*a* as follows.

A1: the supply pipe 26 is connected to the cylinder supply pipe 36 through a meter-in control flow path. A flow path area of the meter-in control flow path is changed in accordance with a stroke of the control valve 16 from the neutral position 16*n* to the extended drive position 16*a*.

A2: the head side supply pipe 38A is connected to the head side pipe 28A.

A3: the rod side pipe 28B is connected to the return pipe 32 and the pressure compensation pipe 44 respectively through throttle means.

A4: the return pipe 30, the bypass return pipe 34, the rod side supply pipe 38B, the pressure compensation pipe 42 and the bypass pipe 46 are blocked. Thereby, the bypass line is interrupted.

Meanwhile, the contracted drive position 16*b* is a position where the control valve 16 leads the discharge oil of the hydraulic pump 10 to the rod side chamber 12*b* of the hydraulic cylinder 12 and contracts the hydraulic cylinder 12. Specifically, the control valve 16 connects and interrupts the oil paths at the contracted drive position 16*b* as follows.

B1: the supply pipe 26 is connected to the cylinder supply pipe 36 through the meter-in control flow path. The flow path area of the meter-in control flow path is changed in accordance with the stroke of the control valve 16 from the neutral position 16*n* to the contracted drive position 16*b*.

B2: the rod side supply pipe 38B is connected to the rod side pipe 28B.

B3: the head side pipe 28A is connected to the return pipe 30 and the pressure compensation pipe 42 respectively through the throttle means.

B4: the return pipe 32, the bypass return pipe 34, the head side supply pipe 38A, the pressure compensation pipe 44 and the bypass pipe 46 are blocked. Thereby, the bypass line is interrupted.

It should be noted that the relief valve 25 is lying between the pump discharge pipe 24 and the tank T on a different route from a bleed-off pipe 50.

Next, a description will be given to a mechanism for controlling the flow rate of the working oil supplied from the hydraulic pump 10 to the control valve 16.

The bleed-off pipe 50 is branched from the pump discharge pipe 24 to the tank T. In the middle of the bleed-off pipe 50, the flow rate control valve 18 is provided. The flow rate control valve 18 is to change the flow rate of the working oil returned from the pump discharge pipe 24 to the tank T through the bleed-off pipe 50 (the bleed-off flow rate), and formed of a pilot operation type flow rate control valve in an example of the figure.

Specifically, the flow rate control valve 18 has a pump side pilot port 54A, a load side pilot port 54B and a closed valve maintaining spring 52. In such a case, when the pilot pressure inputted to the pump side pilot port 54A exceeds the pilot pressure inputted to the load side pilot port 54B for a set differential pressure by the closed valve maintaining spring 52, the flow rate control valve 18 is opened, and activated for opening and closing so as to send the flow rate corresponding the differential pressure to the bleed-off pipe 50.

The pump side pilot port 54A is connected to the pump discharge pipe 24 through a pump side pilot pipe 56. That is, to the pump side pilot port 54A is inputted a discharge pressure of the hydraulic pump 10 directly as the pilot pressure.

Meanwhile, the load side pilot port 54B is connected to the cylinder supply pipe 36 through a load sensing pipe 58. Therefore, to the load side pilot port 54B is inputted a pressure of the cylinder supply pipe 36, that is, a load sensing pressure serving as a pressure on the downstream side of the meter-in control flow path of the control valve 16 as the pilot pressure.

In the middle of the load sensing pipe 58 is provided a check valve 57 for preventing the reversed flow from the flow rate control valve 18 side to the cylinder supply pipe 36. A part between the check valve 57 in the load sensing pipe 58 and the flow rate control valve 18 is connected to the tank T through a depressurizing throttle pipe 59.

Further, as a characteristic of the above hydraulic control device, between the load side pilot port 54B and the check valve 57 is provided a pilot pressure switching valve 60.

The pilot pressure switching valve 60 is to maintain the flow rate control valve 18 in a closed state irrespective of the differential pressure between both the pilot pressures, when the pressure in the supply pipe 36 and the load sensing pipe 58 communicating therewith, that is, the load sensing pressure is lower than a set pressure which is preliminarily set. As specific means thereof, a function of switching the pilot pressure inputted to the load side pilot port 54B in accordance with the load sensing pressure is provided.

Specifically, the pilot pressure switching valve 60 has a closed valve maintaining position 60*a* and a normal position 60*b*, and is provided with a pilot port 62 to which the pilot pressure is inputted. To the pilot port 62 is inputted a primary pressure of the pilot pressure switching valve 60, that is, the load sensing pressure directly as the pilot pressure. The pilot pressure switching valve 60 is maintained at the closed valve maintaining position 60*a*, when the pilot pressure is equal to or lower than the set pressure which is preliminarily set. Only when the pilot pressure exceeds the set pressure, the pilot pressure switching valve 60 is switched from the closed valve maintaining position 60*a* to the normal position 60*b*.

The pilot pressure switching valve 60 interrupts the load sensing pipe 58 in the middle thereof at the closed valve maintaining position 60*a*. Instead, the pilot pressure switching valve 60 connects a pump pressure introduction pipe 64 branched from the pump discharge pipe 24 to the load side pilot port 54B of the flow rate control valve 18. At the normal position 60*b*, the pilot pressure switching valve 60 blocks the pump pressure introduction pipe 64 and opens the load sensing pipe 58.

Next, a description will be given to an effect of the above hydraulic control device.

Firstly, when the operation lever 20 of the remote control valve 14 is not operated and located at a neutral position, the remote control valve 14 does not input the pilot pressure to any of the pilot ports 22A and 22B of the control valve 16. Therefore, the control valve 16 is maintained at the neutral position 16*n*. At the neutral position 16*n*, by blocking the supply pipe 26, the control valve 16 interrupts between the pump discharge pipe 24 and the hydraulic cylinder 12 (that is, closes the meter-in control flow path) so as to maintain the hydraulic cylinder 12 in a static state. Meanwhile, by connecting the bypass pipe 46 branched from the pump discharge pipe 24 to the bypass return pipe 34, the bypass line is opened. Therefore, the discharge oil of the hydraulic pump 10 is led to the tank T through the bypass line (that is, roundabout the hydraulic cylinder 12).

At the time, since the supply pipe 36 is connected to the return pipe 32, the pressure in the supply pipe 36 and the load sensing pipe 58 communicating therewith, that is, the load sensing pressure is low. Therefore, the pilot pressure switching valve 60 receiving the load sensing pressure as the pilot pressure is maintained at the closed valve maintaining position 60*a*. That is, the pilot pressure switching valve 60 interrupts the load sensing pipe 58 from the load side pilot port 54B of the flow rate control valve 18 and connects the load side pilot port 54B to the pump pressure introduction pipe 64. The above connection forms a state that pilot pressures equal to each other (pressures corresponding to the pump pressure) are inputted to both the pilot ports 54A and 54B of the flow rate control valve 18. Therefore, the flow rate control valve 18 is maintained at the valve closing position by an elastic force of the closed valve maintaining spring 52.

In such a state, when the operation lever 20 of the remote control valve 14 is operated to the extended drive side for example, the remote control valve 14 inputs the pilot pressure corresponding to the operation amount of the operation lever 20 to the pilot port 22A of the control valve 16, and lets the control valve 16 make a stroke to the extended drive position 16*a* side. Following the above increase in the stroke, an opening area of the bypass line in the control valve 16, that is, a flow area from the bypass supply pipe 46 to the bypass return pipe 32 is decreased, and simultaneously an opening area of the meter-in control flow path (the flow path connecting the supply pipe 26 connecting to the pump discharge pipe 24 and the cylinder supply pipe 36) is increased. The working oil flowing into the cylinder supply pipe 36 is supplied from the head side supply pipe 38A to the head side chamber 12*a* of the hydraulic cylinder 12 via the head side pipe 28A and activates the hydraulic cylinder 12 in the extending direction. Following the above, the working oil pushed from the rod side chamber 12*b* flows into the rod side supply pipe 38B. A part thereof returns to the tank T through the pressure compensation pipe 44 and the pressure compensation valve 40, and a remainder thereof directly returns to the tank T through the return pipe 32.

At the time, since the increase in the opening area of the meter-in control flow path and the decrease in the opening area of the bypass line progress in accordance with the stroke of the control valve 16, the pump pressure is slowly raised. Therefore, significant shock is not caused. Meanwhile, the load sensing pressure corresponding to the pressure in the cylinder supply pipe 36 is immediately raised to the pressure corresponding to the load pressure of the hydraulic cylinder 12 together with start of the stroke of the control valve 16. At a point when the load sensing pressure exceeds the set pressure of the pilot pressure switching valve 60, the pilot pressure switching valve 60 is switched from the closed valve maintaining position 60*a* to the normal position 60*b*. At the normal position 60*b*, the pilot pressure switching valve 60 leads the load sensing pressure to the load side pilot port 54B of the flow rate control valve 18. However, since the pump pressure is not sufficiently raised at the point, the flow rate control valve 18 is maintained in a closed state.

Then, the pump pressure is continuously raised, and from a point when a differential pressure between the above pump pressure and the load sensing pressure exceeds the set differential pressure (the pressure given by the closed valve maintaining spring 52), the flow rate control valve 18 is gradually opened. Then, irrespective of a change in the load pressure, an opening area of the flow rate control valve 18 is automatically pilot-operated so as to maintain a constant difference between the pump pressure and the load sensing pressure.

As mentioned above, in the above device, at an initial stage before the control valve 16 works, the flow rate control valve 18 is maintained in a closed state, and the discharge oil of the hydraulic pump 10 is transferred to the tank T mainly through the bypass line. After the control valve 16 is started, from a point when the differential pressure between the pump pressure and the load sensing pressure exceeds the set differential pressure, the opening area of the flow rate control valve 18 is gently increased for an amount corresponding to the above differential pressure. Therefore, the pump pressure and the pump flow rate are slowly raised, and the significant shock is not caused. Even if overshoot is caused at start of the flow rate control valve 18, the overshoot is an action in the opening direction of the valve, that is, an action in the transferring direction of the pressure. Therefore, the shock caused by the overshoot is not easily transmitted to the operator.

Figure 2:
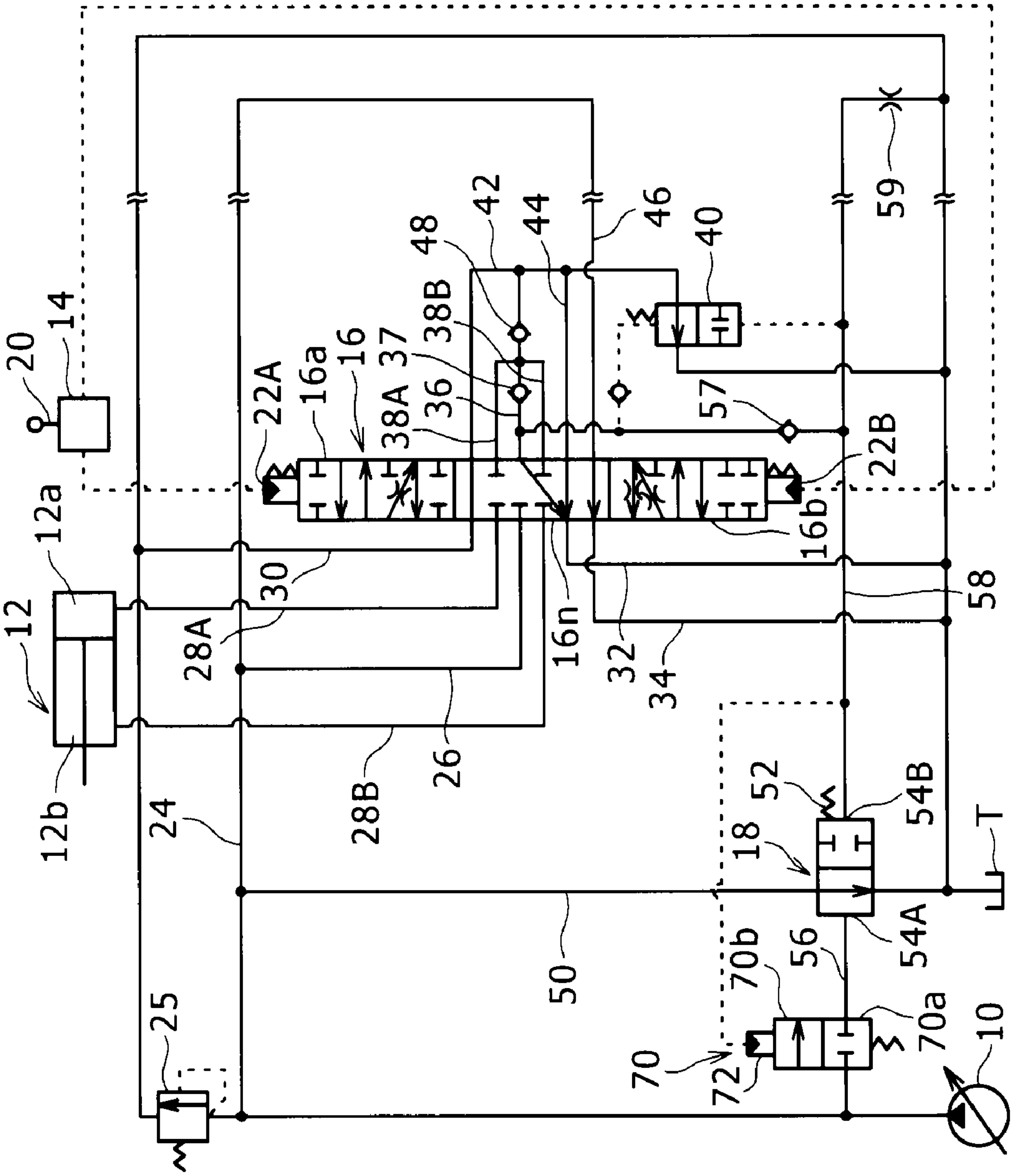
FIG. 2 is a circuit configuration diagram showing a second embodiment of the present invention.
Figure 3:
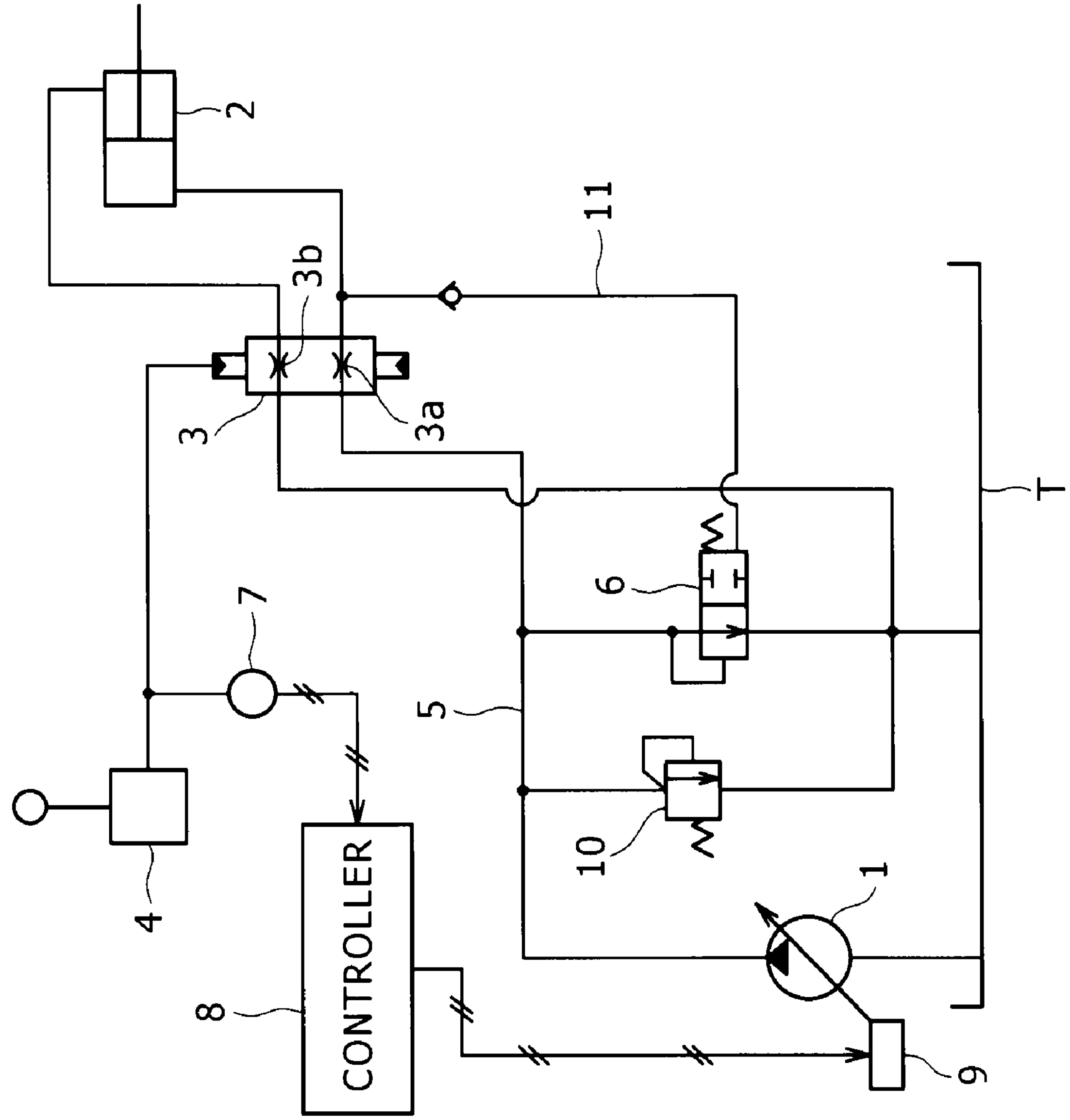
FIG. 3 is a circuit diagram showing a conventional hydraulic control device.

FIG. 2 shows a second embodiment of the present invention. In a device shown in FIG. 2, the pilot pressure switching valve 60 and the pump pressure introduction pipe 64 shown in FIG. 1 are omitted. Instead, in the middle of the pump side pilot pipe 56 (the pipe connecting the pump discharge pipe 24 and the pump side pilot port 54A of the flow rate control valve 18), a pilot pressure switching valve 70 is provided. As well as the pilot pressure switching valve 60 according to the first embodiment, the pilot pressure switching valve 70 has a pilot port 72 to which the pressure in the load sensing pipe 58 is inputted as the pilot pressure. In such a case, when the above pilot pressure is equal to or lower than the set pressure which is preliminarily set, the pilot pressure switching valve 70 is maintained at a closed valve maintaining position 70*a* for interrupting the pump side pilot pipe 56, and switched to a normal position 70*b* for opening the pump side pilot pipe 56 at a point when the pilot pressure exceeds the set pressure.

In the device according to the second embodiment, when the control valve 16 is located at the neutral position 16*n*, the pilot pressure switching valve 70 is also maintained at the closed valve maintaining position 70*a* and interrupts the input of the pilot pressure to the pump side pilot port 54A. Thereby, the flow rate control valve 18 is maintained in a closed state. At a point when the load sensing pressure exceeds the set pressure of the pilot pressure switching valve 70, the pilot pressure switching valve 70 is switched to the normal position 70*b* so as to allow the input of the pilot pressure (the pump pressure) to the pump side pilot port 54A. From a point when the differential pressure between the pump pressure and the load sensing pressure exceeds the set differential pressure, the opening area of the flow rate control valve 18 is gently increased.

It should be noted that bypass switching means according to the present invention is not necessarily installed in the control valve 16. For example, a bypass line and a bypass switching valve for opening and closing the bypass line may be provided separately from the control valve 16, and the pilot pressure may also be inputted to the bypass switching valve so that the bypass switching valve is interlocked with the control valve 16. However, when the above bypass switching function is installed in the control valve 16, it is possible to surely interlock the control valve 16 and the bypass switching with a simple configuration.

Although the invention has been described with reference to the preferred embodiments in the attached figures, it is noted that equivalents may be employed and substitutions made herein without departing from the scope of the invention as recited in the claims.

We claim:

1. A hydraulic control device of construction machine, comprising:

a hydraulic pump;

a hydraulic actuator to which working oil is supplied from said hydraulic pump;

an operation member operated by an operator;

a control valve having a meter-in control flow path lying between said hydraulic pump and said hydraulic actuator, the control valve working so as to change a flow rate of the working oil supplied from said hydraulic pump to said hydraulic actuator through said meter-in control flow path following the operation of said operation member;

a flow rate control valve lying between a pump discharge line on the upstream side of said control valve and a tank, the flow rate control valve for changing a flow rate of the working oil returned from said pump discharge line to said tank;

flow rate control means for activating said flow rate control valve for opening and closing in the direction of maintaining a constant differential pressure between a pressure of the working oil in said pump discharge line and a pressure on the downstream side of said meter-in control flow path;

closed valve maintaining means for maintaining said flow rate control valve in a closed state irrespective of the differential pressure when the pressure on the downstream side of said meter-in control flow path is lower than a set pressure which is preliminarily set;

a bypass line for communicating with said pump discharge line and said tank on a different route from said flow rate control valve; and bypass switching means for opening said bypass line when said control valve closes said meter-in control flow path, and decreasing a flow path area of said bypass line following an increase in a flow path area of said meter-in control flow path.

2. The hydraulic control device of construction machine according to claim 1, wherein said flow rate control valve is a pilot operation flow rate control valve having a pump side pilot pressure input unit and a load side pilot pressure input unit to which a pilot pressure is inputted respectively, and controlling a flow rate of the working oil so as to maintain a constant difference between a pilot pressure inputted to said pump side pilot pressure input unit and a pilot pressure inputted to said load side pilot pressure input unit, said flow rate control means, meanwhile, includes a pump side pilot line for inputting the pressure of said pump discharge line to said pump side pilot pressure input unit and a load side pilot line for inputting the pressure on the downstream side of said meter-in control flow path to said load side pilot pressure input unit, and said closed valve maintaining means includes pilot pressure switching means for interrupting at least one pilot line among both said pilot lines so that both said pilot pressures become a pilot pressure for closing said flow rate control valve when the pressure on the downstream side of said meter-in control flow path is equal to or lower than the set pressure.

3. The hydraulic control device of construction machine according to claim 2, wherein said flow rate control valve is maintained in a closed state at least when the pilot pressure inputted to said pump side pilot pressure input unit is equal to the pilot pressure inputted to said load side pilot pressure input unit, said pilot pressure switching means is a pilot pressure switching valve capable of switching between a normal position for opening said load side pilot line and a closed valve maintaining position for interrupting said load side pilot line and inputting a pressure corresponding to a discharge pressure of said pump to said load side pilot pressure input unit, and also capable of switching to the closed valve maintaining position only when the pressure on the downstream side of said meter-in control flow path is equal to or lower than the set pressure.

4. The hydraulic control device of construction machine according to claim 2, wherein said pilot pressure switching means is a pilot pressure switching valve capable of switching between a normal position for opening said pump side pilot line and a closed valve maintaining position for interrupting said pump side pilot line, and also capable of switching to the closed valve maintaining position only when the pressure on the downstream side of said meter-in control flow path is equal to or lower than the set pressure.

5. The hydraulic control device of construction machine according to claim 1, wherein said control valve also serves as said bypass switching means, the control valve being provided in the middle of said bypass line for opening said bypass line at a position of interrupting between said hydraulic pump and said hydraulic actuator.

* * * * *